(12) United States Patent
Brennan et al.

(10) Patent No.: US 9,458,779 B2
(45) Date of Patent: Oct. 4, 2016

(54) INTAKE RUNNER TEMPERATURE DETERMINATION SYSTEMS AND METHODS

(71) Applicant: GM Global Technology Operations LLC, Detroit, MI (US)

(72) Inventors: Daniel G. Brennan, Brighton, MI (US); Gregory P. Matthews, West Bloomfield, MI (US); Layne K. Wiggins, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 703 days.

(21) Appl. No.: 13/798,624

(22) Filed: Mar. 13, 2013

(65) Prior Publication Data

US 2014/0190448 A1 Jul. 10, 2014

Related U.S. Application Data

(60) Provisional application No. 61/749,526, filed on Jan. 7, 2013.

(51) Int. Cl.
*G06F 19/00* (2011.01)
*F02D 41/00* (2006.01)
(Continued)

(52) U.S. Cl.
CPC ........ *F02D 41/0087* (2013.01); *F02D 41/0062* (2013.01); *F02D 41/0072* (2013.01);
(Continued)

(58) Field of Classification Search
CPC ...... Y02T 10/46; Y02T 10/42; F02P 5/1502; F02D 41/0087; F02D 2200/0416; F02D 41/0062; F02D 2041/1432; F02D 41/0072; F02D 2009/0225; F02D 2009/0237; F02D 17/02; F02D 17/00; F02D 2200/0402; F02D 2200/0414; F02D 41/18; F02D 2200/0408; F02D 2200/0406

USPC ........ 123/435, 464, 350, 481; 701/101–103, 701/105, 108, 112; 73/114.31, 114.32, 73/114.33

See application file for complete search history.

(56) References Cited

U.S. PATENT DOCUMENTS 3,596,640 A 8/1971 Bloomfield
4,129,034 A 12/1978 Niles et al.
(Continued)

FOREIGN PATENT DOCUMENTS

CN 1573916 A 2/2005
CN 1888407 A 1/2007
(Continued)

OTHER PUBLICATIONS

U.S. Appl. No. 14/548,501, filed Nov. 20, 2014, Beikmann et al.
(Continued)

*Primary Examiner* — Stephen K Cronin
*Assistant Examiner* — Brian Kirby

(57) ABSTRACT

An engine control system of a vehicle includes a manifold temperature module, a runner temperature module. The manifold temperature module determines a first temperature of gas in an intake manifold of an engine. The runner temperature module determines a second temperature of gas in an intake runner associated with a cylinder based on the first temperature of the gas in the intake manifold. The engine control system further includes at least one of: a fuel control module that controls fueling of the cylinder based on the second temperature of the gas in the intake runner; and a spark control module that controls spark of the cylinder based on the second temperature of the gas in the intake runner.

16 Claims, 4 Drawing Sheets

(51) Int. Cl.
*F02P 5/15* (2006.01)
*F02D 41/14* (2006.01)

(52) U.S. Cl.
CPC .......... *F02D2041/1432* (2013.01); *F02D 2200/0408* (2013.01); *F02D 2200/0414* (2013.01); *F02D 2200/0416* (2013.01); *F02P 5/1502* (2013.01); *Y02T 10/46* (2013.01)

(56) References Cited

U.S. PATENT DOCUMENTS

| | | | |
|---|---|---|---|
| 4,172,434 A | 10/1979 | Coles | |
| 4,377,997 A | 3/1983 | Staerzl | |
| 4,434,767 A | 3/1984 | Kohama et al. | |
| 4,489,695 A | 12/1984 | Kohama et al. | |
| 4,509,488 A | 4/1985 | Forster et al. | |
| 4,535,744 A | 8/1985 | Matsumura | |
| 4,770,148 A * | 9/1988 | Hibino | F02D 41/005 123/435 |
| 4,887,216 A | 12/1989 | Ohnari et al. | |
| 4,974,563 A | 12/1990 | Ikeda et al. | |
| 4,987,888 A | 1/1991 | Funabashi et al. | |
| 5,042,444 A | 8/1991 | Hayes et al. | |
| 5,094,213 A | 3/1992 | Dudek et al. | |
| 5,226,513 A | 7/1993 | Shibayama | |
| 5,278,760 A | 1/1994 | Ribbens et al. | |
| 5,357,932 A | 10/1994 | Clinton et al. | |
| 5,374,224 A | 12/1994 | Huffmaster et al. | |
| 5,377,631 A | 1/1995 | Schechter | |
| 5,423,208 A | 6/1995 | Dudek et al. | |
| 5,465,617 A | 11/1995 | Dudek et al. | |
| 5,540,633 A | 7/1996 | Yamanaka et al. | |
| 5,553,575 A | 9/1996 | Beck et al. | |
| 5,584,266 A | 12/1996 | Motose et al. | |
| 5,669,354 A | 9/1997 | Morris | |
| 5,692,471 A | 12/1997 | Zhang | |
| 5,720,257 A | 2/1998 | Motose et al. | |
| 5,813,383 A * | 9/1998 | Cummings | F01L 1/146 123/145 A |
| 5,884,605 A | 3/1999 | Nagaishi et al. | |
| 5,909,720 A | 6/1999 | Yamaoka et al. | |
| 5,931,140 A * | 8/1999 | Maloney | F02D 41/0072 123/480 |
| 5,934,263 A * | 8/1999 | Russ | F01L 1/34 123/568.14 |
| 5,941,927 A * | 8/1999 | Pfitz | G01M 15/048 374/144 |
| 5,974,870 A * | 11/1999 | Treinies | F02D 41/0072 73/114.33 |
| 5,975,052 A | 11/1999 | Moyer | |
| 5,983,867 A * | 11/1999 | Stuber | F02D 41/04 123/478 |
| 6,125,812 A | 10/2000 | Garabedian | |
| 6,158,411 A | 12/2000 | Morikawa | |
| 6,244,242 B1 | 6/2001 | Grizzle et al. | |
| 6,247,449 B1 | 6/2001 | Persson | |
| 6,272,427 B1 * | 8/2001 | Wild | F02D 41/04 123/568.11 |
| 6,286,366 B1 * | 9/2001 | Chen | F02D 41/32 73/114.31 |
| 6,295,500 B1 | 9/2001 | Cullen et al. | |
| 6,332,446 B1 | 12/2001 | Matsumoto et al. | |
| 6,334,425 B1 * | 1/2002 | Nagatani | F02D 41/1456 123/295 |
| 6,355,986 B1 | 3/2002 | Kato et al. | |
| 6,360,724 B1 | 3/2002 | Suhre et al. | |
| 6,363,316 B1 | 3/2002 | Soliman et al. | |
| 6,371,075 B2 * | 4/2002 | Koch | 123/198 F |
| 6,385,521 B1 | 5/2002 | Ito | |
| 6,408,625 B1 | 6/2002 | Woon et al. | |
| 6,520,140 B2 | 2/2003 | Dreymuller et al. | |
| 6,546,912 B2 | 4/2003 | Tuken | |
| 6,588,261 B1 * | 7/2003 | Wild | F02D 11/105 701/101 |
| 6,619,258 B2 | 9/2003 | McKay et al. | |
| 6,622,548 B1 * | 9/2003 | Hernandez | F02D 41/1447 73/114.31 |
| 6,694,806 B2 | 2/2004 | Kumagai et al. | |
| 6,738,707 B2 * | 5/2004 | Kotwicki | F02D 41/18 701/108 |
| 6,754,577 B2 * | 6/2004 | Gross | F02D 13/0215 123/436 |
| 6,760,656 B2 * | 7/2004 | Matthews | F02D 41/0087 123/480 |
| 6,850,831 B2 * | 2/2005 | Buckland | F02D 41/0062 123/568.14 |
| 6,909,961 B2 * | 6/2005 | Wild | F02D 41/0072 374/E7.042 |
| 6,978,204 B2 | 12/2005 | Surnilla et al. | |
| 6,980,902 B2 * | 12/2005 | Nakazawa | F02D 41/0002 123/508 |
| 6,981,492 B2 * | 1/2006 | Barba | F02D 13/0261 123/568.11 |
| 6,983,737 B2 * | 1/2006 | Gross | F02D 35/025 123/435 |
| 7,003,390 B2 * | 2/2006 | Kaga | F02D 41/182 701/101 |
| 7,024,301 B1 * | 4/2006 | Kar | F02D 35/025 123/478 |
| 7,025,041 B2 * | 4/2006 | Abe | F02D 35/024 123/432 |
| 7,028,661 B1 * | 4/2006 | Bonne | F02D 17/02 123/198 F |
| 7,032,545 B2 | 4/2006 | Lewis et al. | |
| 7,032,581 B2 | 4/2006 | Gibson et al. | |
| 7,044,101 B1 | 5/2006 | Duty et al. | |
| 7,063,062 B2 | 6/2006 | Lewis et al. | |
| 7,066,121 B2 | 6/2006 | Michelini et al. | |
| 7,066,136 B2 | 6/2006 | Ogiso | |
| 7,069,718 B2 | 7/2006 | Surnilla et al. | |
| 7,069,773 B2 * | 7/2006 | Stempnik | F02D 11/105 73/114.32 |
| 7,086,386 B2 | 8/2006 | Doering | |
| 7,100,720 B2 | 9/2006 | Ishikawa | |
| 7,111,612 B2 | 9/2006 | Michelini et al. | |
| 7,140,355 B2 | 11/2006 | Michelini et al. | |
| 7,159,568 B1 | 1/2007 | Lewis et al. | |
| 7,174,713 B2 * | 2/2007 | Nitzke | F02D 41/0007 123/568.21 |
| 7,174,879 B1 | 2/2007 | Chol et al. | |
| 7,200,486 B2 * | 4/2007 | Tanaka | F02D 11/105 701/103 |
| 7,203,588 B2 | 4/2007 | Kaneko et al. | |
| 7,231,907 B2 | 6/2007 | Bolander et al. | |
| 7,278,391 B1 | 10/2007 | Wong et al. | |
| 7,292,231 B2 | 11/2007 | Kodama et al. | |
| 7,292,931 B2 | 11/2007 | Davis et al. | |
| 7,319,929 B1 | 1/2008 | Davis et al. | |
| 7,363,111 B2 | 4/2008 | Vian et al. | |
| 7,367,318 B2 * | 5/2008 | Moriya | F02D 13/0203 123/435 |
| 7,415,345 B2 * | 8/2008 | Wild | F02D 41/1401 123/399 |
| 7,440,838 B2 | 10/2008 | Livshiz et al. | |
| 7,464,676 B2 | 12/2008 | Wiggins et al. | |
| 7,472,014 B1 | 12/2008 | Albertson et al. | |
| 7,497,074 B2 | 3/2009 | Surnilla et al. | |
| 7,499,791 B2 | 3/2009 | You et al. | |
| 7,503,312 B2 | 3/2009 | Surnilla et al. | |
| 7,509,201 B2 | 3/2009 | Bolander et al. | |
| 7,555,896 B2 | 7/2009 | Lewis et al. | |
| 7,577,511 B1 | 8/2009 | Tripathi et al. | |
| 7,581,531 B2 * | 9/2009 | Schulz | F02D 41/0087 123/198 DB |
| 7,614,384 B2 | 11/2009 | Livshiz et al. | |
| 7,620,188 B2 | 11/2009 | Inoue et al. | |
| 7,621,262 B2 * | 11/2009 | Zubeck | B60K 6/442 123/543 |
| 7,634,349 B2 * | 12/2009 | Senft | F01L 1/34 123/568.14 |
| 7,685,976 B2 | 3/2010 | Marriott | |
| 7,785,230 B2 | 8/2010 | Gibson et al. | |
| 7,836,866 B2 | 11/2010 | Luken et al. | |
| 7,849,835 B2 | 12/2010 | Tripathi et al. | |

(56) References Cited

U.S. PATENT DOCUMENTS

| | | | |
|---|---|---|---|
| 7,886,715 B2 | 2/2011 | Tripathi et al. | |
| 7,930,087 B2 | 4/2011 | Gibson et al. | |
| 7,946,263 B2 * | 5/2011 | O'Neill | F01L 1/143 |
| | | | 123/295 |
| 7,954,474 B2 | 6/2011 | Tripathi et al. | |
| 8,050,841 B2 | 11/2011 | Costin et al. | |
| 8,099,224 B2 | 1/2012 | Tripathi et al. | |
| 8,108,132 B2 | 1/2012 | Reinke | |
| 8,131,445 B2 | 3/2012 | Tripathi et al. | |
| 8,131,447 B2 | 3/2012 | Tripathi et al. | |
| 8,135,410 B2 | 3/2012 | Forte | |
| 8,145,410 B2 | 3/2012 | Berger et al. | |
| 8,146,565 B2 | 4/2012 | Leone et al. | |
| 8,272,367 B2 | 9/2012 | Shikama et al. | |
| 8,347,856 B2 | 1/2013 | Leone et al. | |
| 8,473,179 B2 | 6/2013 | Whitney et al. | |
| 8,616,181 B2 | 12/2013 | Sahandiesfanjani et al. | |
| 8,646,430 B2 | 2/2014 | Kinoshita | |
| 8,646,435 B2 | 2/2014 | Dibble et al. | |
| 8,701,628 B2 | 4/2014 | Tripathi et al. | |
| 8,706,383 B2 | 4/2014 | Sauve et al. | |
| 8,833,058 B2 | 9/2014 | Ervin et al. | |
| 8,833,345 B2 | 9/2014 | Pochner et al. | |
| 8,869,773 B2 | 10/2014 | Tripathi et al. | |
| 8,979,708 B2 | 3/2015 | Burtch | |
| 9,140,622 B2 | 9/2015 | Beikmann | |
| 9,222,427 B2 | 12/2015 | Matthews et al. | |
| 2001/0007964 A1 | 7/2001 | Poljansek et al. | |
| 2002/0039950 A1 | 4/2002 | Graf et al. | |
| 2002/0156568 A1 | 10/2002 | Knott et al. | |
| 2002/0162540 A1 | 11/2002 | Matthews et al. | |
| 2002/0189574 A1 | 12/2002 | Kim | |
| 2003/0116130 A1 | 6/2003 | Kisaka et al. | |
| 2003/0123467 A1 | 7/2003 | Du et al. | |
| 2003/0131820 A1 | 7/2003 | Mckay et al. | |
| 2003/0172900 A1 | 9/2003 | Boyer et al. | |
| 2004/0007211 A1 | 1/2004 | Kobayashi | |
| 2004/0034460 A1 | 2/2004 | Folkerts et al. | |
| 2004/0069290 A1 | 4/2004 | Bucktron et al. | |
| 2004/0122584 A1 * | 6/2004 | Muto | F02D 41/0072 |
| | | | 701/108 |
| 2004/0129249 A1 | 7/2004 | Kondo | |
| 2004/0206072 A1 | 10/2004 | Surnilla et al. | |
| 2004/0258251 A1 | 12/2004 | Inoue et al. | |
| 2005/0016492 A1 | 1/2005 | Matthews | |
| 2005/0056250 A1 | 3/2005 | Stroh | |
| 2005/0098156 A1 | 5/2005 | Ohtani | |
| 2005/0131618 A1 | 6/2005 | Megli et al. | |
| 2005/0197761 A1 | 9/2005 | Bidner et al. | |
| 2005/0199220 A1 | 9/2005 | Ogiso | |
| 2005/0204726 A1 | 9/2005 | Lewis | |
| 2005/0204727 A1 | 9/2005 | Lewis et al. | |
| 2005/0205028 A1 | 9/2005 | Lewis et al. | |
| 2005/0205045 A1 | 9/2005 | Michelini et al. | |
| 2005/0205060 A1 | 9/2005 | Michelini et al. | |
| 2005/0205063 A1 | 9/2005 | Kolmanovsky et al. | |
| 2005/0205069 A1 | 9/2005 | Lewis et al. | |
| 2005/0205074 A1 | 9/2005 | Gibson et al. | |
| 2005/0235743 A1 | 10/2005 | Stempnik et al. | |
| 2006/0107919 A1 | 5/2006 | Nishi et al. | |
| 2006/0112918 A1 * | 6/2006 | Persson | F01L 1/181 |
| | | | 123/90.16 |
| 2006/0130814 A1 | 6/2006 | Bolander et al. | |
| 2006/0178802 A1 | 8/2006 | Bolander et al. | |
| 2007/0012040 A1 * | 1/2007 | Nitzke | F02D 41/0007 |
| | | | 60/605.2 |
| 2007/0042861 A1 | 2/2007 | Takaoka et al. | |
| 2007/0051351 A1 | 3/2007 | Pallett et al. | |
| 2007/0100534 A1 * | 5/2007 | Katsumata | F02D 35/023 |
| | | | 701/103 |
| 2007/0101969 A1 | 5/2007 | Lay et al. | |
| 2007/0107692 A1 | 5/2007 | Kuo et al. | |
| 2007/0131169 A1 | 6/2007 | Ahn | |
| 2007/0131196 A1 | 6/2007 | Gibson et al. | |
| 2007/0135988 A1 | 6/2007 | Kidston et al. | |
| 2007/0235005 A1 | 10/2007 | Lewis | |
| 2008/0000149 A1 * | 1/2008 | Aradi | C10L 1/00 |
| | | | 44/359 |
| 2008/0041327 A1 | 2/2008 | Lewis et al. | |
| 2008/0066699 A1 | 3/2008 | Michelini et al. | |
| 2008/0098969 A1 | 5/2008 | Reed et al. | |
| 2008/0109151 A1 | 5/2008 | Jaros et al. | |
| 2008/0121211 A1 | 5/2008 | Livshiz et al. | |
| 2008/0154468 A1 * | 6/2008 | Berger | B60K 6/365 |
| | | | 701/54 |
| 2008/0254926 A1 | 10/2008 | Schuseil et al. | |
| 2008/0262698 A1 | 10/2008 | Lahti et al. | |
| 2008/0288146 A1 | 11/2008 | Beechie et al. | |
| 2009/0007877 A1 | 1/2009 | Raiford | |
| 2009/0013667 A1 | 1/2009 | Winstead | |
| 2009/0013668 A1 | 1/2009 | Winstead | |
| 2009/0013669 A1 * | 1/2009 | Winstead | F02M 26/43 |
| | | | 60/278 |
| 2009/0013969 A1 | 1/2009 | Winstead | |
| 2009/0018746 A1 * | 1/2009 | Miller | F02D 35/023 |
| | | | 701/102 |
| 2009/0030594 A1 | 1/2009 | You et al. | |
| 2009/0042458 A1 | 2/2009 | Kinoshita | |
| 2009/0042463 A1 | 2/2009 | Kinoshita | |
| 2009/0118914 A1 | 5/2009 | Schwenke et al. | |
| 2009/0118968 A1 | 5/2009 | Livshiz et al. | |
| 2009/0118975 A1 | 5/2009 | Murakami et al. | |
| 2009/0118986 A1 | 5/2009 | Kita | |
| 2009/0177371 A1 | 7/2009 | Reinke | |
| 2009/0204312 A1 | 8/2009 | Moriya | |
| 2009/0241872 A1 | 10/2009 | Wang et al. | |
| 2009/0248277 A1 | 10/2009 | Shinagawa et al. | |
| 2009/0248278 A1 | 10/2009 | Nakasaka | |
| 2009/0292435 A1 | 11/2009 | Costin et al. | |
| 2010/0006065 A1 | 1/2010 | Tripathi et al. | |
| 2010/0010724 A1 | 1/2010 | Tripathi et al. | |
| 2010/0012072 A1 | 1/2010 | Leone et al. | |
| 2010/0030447 A1 | 2/2010 | Smyth et al. | |
| 2010/0036571 A1 | 2/2010 | Han et al. | |
| 2010/0042308 A1 * | 2/2010 | Kobayashi | F02D 41/065 |
| | | | 701/104 |
| 2010/0050993 A1 | 3/2010 | Zhao et al. | |
| 2010/0059004 A1 | 3/2010 | Gill | |
| 2010/0100299 A1 | 4/2010 | Tripathi et al. | |
| 2010/0107630 A1 * | 5/2010 | Hamama | F02B 37/001 |
| | | | 60/602 |
| 2010/0211299 A1 | 8/2010 | Lewis et al. | |
| 2010/0222989 A1 * | 9/2010 | Nishimura | F01L 1/053 |
| | | | 701/105 |
| 2010/0282202 A1 | 11/2010 | Luken | |
| 2010/0318275 A1 | 12/2010 | Borchsenius et al. | |
| 2011/0005496 A1 | 1/2011 | Hiraya et al. | |
| 2011/0030657 A1 | 2/2011 | Tripathi et al. | |
| 2011/0048372 A1 | 3/2011 | Dibble et al. | |
| 2011/0088661 A1 * | 4/2011 | Sczomak | F02D 41/0087 |
| | | | 123/481 |
| 2011/0094475 A1 | 4/2011 | Riegel et al. | |
| 2011/0107986 A1 | 5/2011 | Winstead | |
| 2011/0144883 A1 | 6/2011 | Rollinger et al. | |
| 2011/0178693 A1 | 7/2011 | Chang et al. | |
| 2011/0208405 A1 | 8/2011 | Tripathi et al. | |
| 2011/0213540 A1 | 9/2011 | Tripathi et al. | |
| 2011/0213541 A1 | 9/2011 | Tripathi et al. | |
| 2011/0251773 A1 | 10/2011 | Sahandiesfanjani et al. | |
| 2011/0264342 A1 | 10/2011 | Baur et al. | |
| 2011/0265454 A1 * | 11/2011 | Smith | F01N 3/0842 |
| | | | 60/274 |
| 2011/0265771 A1 * | 11/2011 | Banker | F01N 3/0814 |
| | | | 123/564 |
| 2011/0295483 A1 | 12/2011 | Ma et al. | |
| 2011/0313643 A1 * | 12/2011 | Lucatello | F02D 13/0261 |
| | | | 701/112 |
| 2012/0029787 A1 | 2/2012 | Whitney et al. | |
| 2012/0055444 A1 | 3/2012 | Tobergte et al. | |
| 2012/0103312 A1 | 5/2012 | Sasai et al. | |
| 2012/0109495 A1 | 5/2012 | Tripathi et al. | |
| 2012/0116647 A1 | 5/2012 | Pochner et al. | |
| 2012/0143471 A1 | 6/2012 | Tripathi et al. | |
| 2012/0180759 A1 | 7/2012 | Whitney et al. | |

(56) References Cited

U.S. PATENT DOCUMENTS

| | | |
|---|---|---|
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | | |
|---|---|---|---|
| CN | 101220780 A | | 7/2008 |
| CN | 101353992 A | | 1/2009 |
| CN | 101476507 A | | 7/2009 |
| CN | 101586504 A | | 11/2009 |
| CN | 102454493 A | | 5/2012 |
| EP | 1489595 A2 | | 12/2004 |
| JP | 2010223019 A | * | 10/2010 |
| JP | 2011149352 A | | 8/2011 |

OTHER PUBLICATIONS

U.S. Appl. No. 61/952,737, filed Mar. 13, 2014, Shost et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.
U.S. Appl. No. 13/798,451, filed Mar. 13, 2013, Rayl.
U.S. Appl. No. 13/798,351, filed Mar. 13, 2013, Rayl.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,536, filed Mar. 13, 2013, Matthews et al.
U.S. Appl. No. 13/798,435, filed Mar. 13, 2013, Matthews.
U.S. Appl. No. 13/798,471, filed Mar. 13, 2013, Matthews et al.
U.S. Appl. No. 13/798,737, filed Mar. 13, 2013, Beikmann.
U.S. Appl. No. 13/798,701, filed Mar. 13, 2013, Burleigh et al.
U.S. Appl. No. 13/798,518, filed Mar. 13, 2013, Beikmann.
U.S. Appl. No. 13/799,129, filed Mar. 13, 2013, Beikmann.
U.S. Appl. No. 13/798,540, filed Mar. 13, 2013, Brennan et al.
U.S. Appl. No. 13/798,574, filed Mar. 13, 2013, Verner.
U.S. Appl. No. 13/799,181, filed Mar. 13, 2013, Beikmann.
U.S. Appl. No. 13/799,116, filed Mar. 13, 2013, Brennan.
U.S. Appl. No. 13/798,384, filed Mar. 13, 2013, Brennan et al.
U.S. Appl. No. 13/798,775, filed Mar. 13, 2013, Phillips.
U.S. Appl. No. 13/798,400, filed Mar. 13, 2013, Phillips.
U.S. Appl. No. 14/211,389, Mar. 14, 2014, Liu et al.
U.S. Appl. No. 14/300,469, Jun. 10, 2014, Li et al.
U.S. Appl. No. 14/310,063, Jun. 20, 2014, Wagh et al.
U.S. Appl. No. 14/449,726, Aug. 1, 2014, Hayman et al.

* cited by examiner

INTAKE RUNNER TEMPERATURE DETERMINATION SYSTEMS AND METHODS

CROSS-REFERENCE TO RELATED APPLICATIONS

This application claims the benefit of U.S. Provisional Application No. 61/749,526, filed on Jan. 7, 2013. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to internal combustion engines and more particularly to systems and methods for determining intake runner temperatures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating opening and closing of intake and exhaust valves of the cylinder and halting fueling of the cylinder. One or more cylinders may be deactivated, for example, to decrease fuel consumption when the engine can produce a requested amount of torque while the one or more cylinders are deactivated.

SUMMARY

An engine control system of a vehicle includes a manifold temperature module, a runner temperature module. The manifold temperature module determines a first temperature of gas in an intake manifold of an engine. The runner temperature module determines a second temperature of gas in an intake runner associated with a cylinder based on the first temperature of the gas in the intake manifold. The engine control system further includes at least one of: a fuel control module that controls fueling of the cylinder based on the second temperature of the gas in the intake runner; and a spark control module that controls spark of the cylinder based on the second temperature of the gas in the intake runner.

An engine control method for a vehicle includes: determining a first temperature of gas in an intake manifold of an engine; and determining a second temperature of gas in an intake runner associated with a cylinder based on the first temperature of the gas in the intake manifold. The engine control method further includes at least one of: controlling fueling of the cylinder based on the second temperature of the gas in the intake runner; and controlling spark of the cylinder based on the second temperature of the gas in the intake runner.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Air flows into an intake manifold of an engine through a throttle valve. An exhaust gas recirculation (EGR) system may circulate exhaust produced by the engine back to the intake manifold. Gas flows from the intake manifold through intake runners and into the cylinders, respectively.

Under some circumstances, an engine control module (ECM) may deactivate one or more cylinders of the engine. The ECM may deactivate one or more cylinders, for example, to decrease fuel consumption when the engine can produce a requested amount of torque while the one or more cylinders are deactivated.

The ECM may predict an amount (e.g., mass) of air that will be trapped within a cylinder of the engine. This amount may be referred to as an air per cylinder (APC). The ECM may control one or more engine operating parameters based on the APC of a cylinder. For example, the ECM may control spark timing of the cylinder, fueling of the cylinder, and/or camshaft phasing for the cylinder based on the APC of the cylinder.

Temperature of the gas within the intake runner of a cylinder, however, may vary based upon whether the cylinder is activated or deactivated. The temperature of the gas within the intake runner affects density of the gas that will be trapped within the cylinder and therefore affects the APC of the cylinder.

The ECM of the present disclosure estimates a temperature of gas within an intake runner associated with a cylinder based on whether the cylinder is activated or deactivated. The ECM determines the APC of the cylinder based on the temperature of the gas within the intake runner. Determining the APC based on the temperature of the gas within the intake runner may enable the ECM to more accurately control fueling of the cylinder, spark timing of the cylinder, camshaft phasing for the cylinder, and/or one or more other engine operating parameters.

Figure 1:
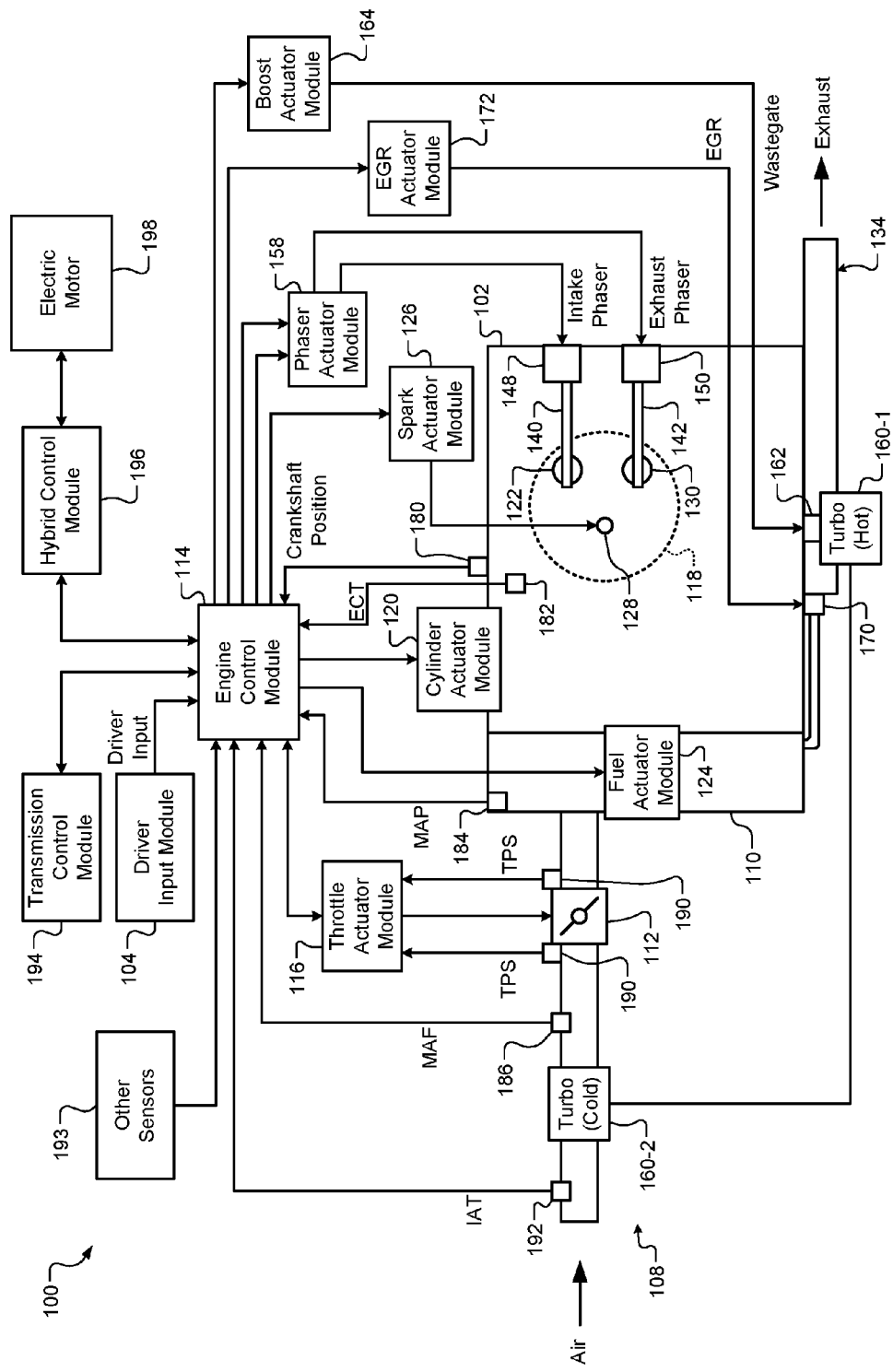
FIG. 1 is a functional block diagram of an example engine system according to the present disclosure.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102 through intake runners, respectively. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake runner and an intake valve 122 during the intake stroke. The intake valve 122 opens and closes the intake runner. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders (e.g., into the intake runners). In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150.

A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to the transmission via the crankshaft.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to cylinder activation/deactivation parameters, fueling parameters, intake and exhaust cam phaser angles, boost pressure, and EGR valve opening area, respectively. The ECM 114 may control the actuator values in order to cause the engine 102 to generate a desired engine output torque.

Figure 2:
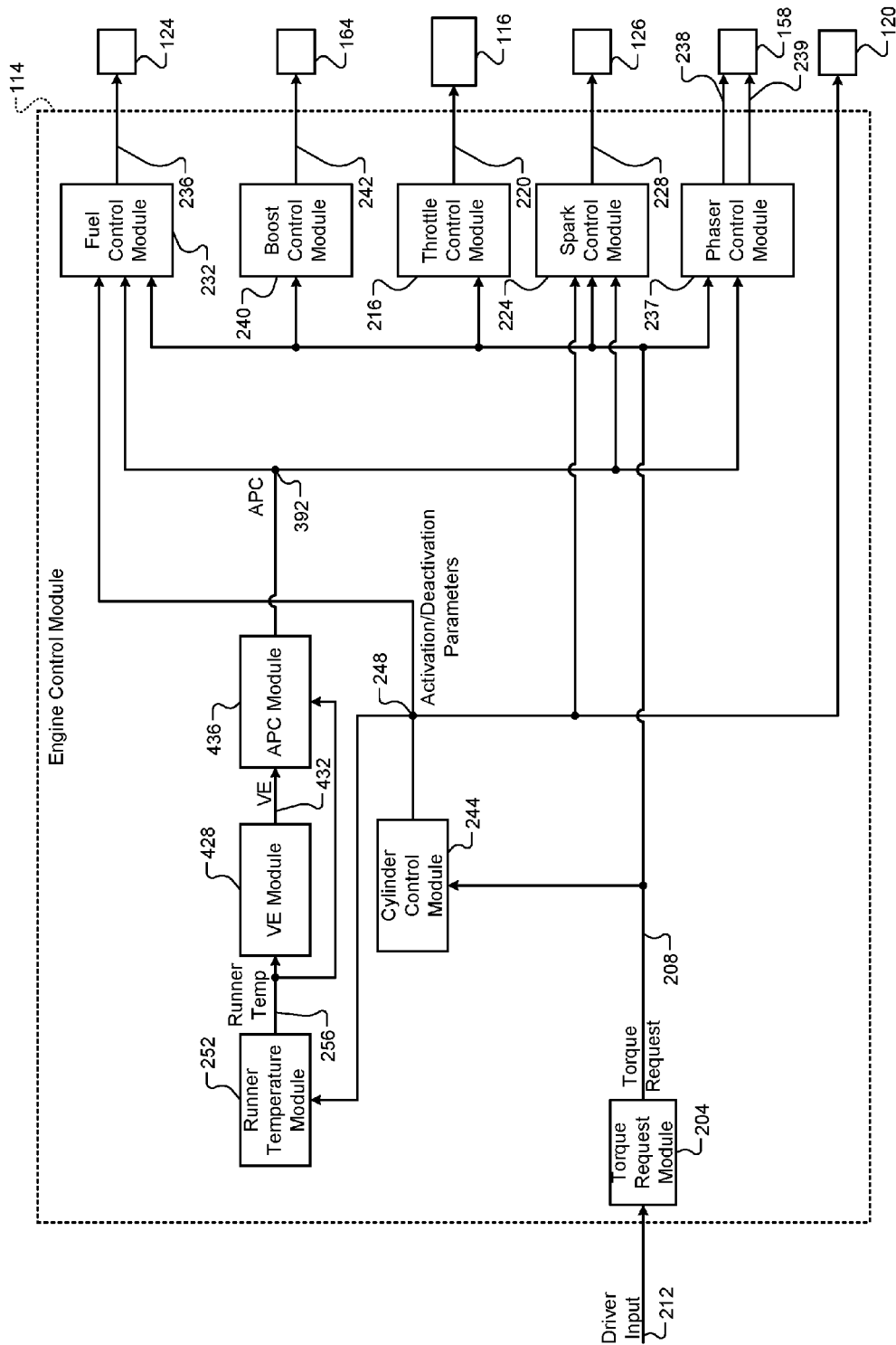
FIG. 2 is a functional block diagram of an example engine control system according to the present disclosure.

Referring now to FIG. 2, a functional block diagram of an example engine control system is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators may be controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 may determine a target spark timing 228 based on the torque request 208. The spark actuator module 126 may generate spark based on the target spark timing 228. A fuel control module 232 may determine one or more target fueling parameters 236 based on the torque request 208. For example, the target fueling parameters 236 may include fuel injection amount, number of fuel injections for injecting the amount, and timing for each of the injections. The fuel actuator module 124 may inject fuel based on the target fueling parameters 236.

A phaser control module 237 may determine target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242. While not shown, an EGR control module may determine a target EGR opening based on the torque request 208, and the EGR actuator module 172 may control opening of the EGR valve 170 based on the target EGR opening.

A cylinder control module 244 determines a target cylinder activation/deactivation parameters 248 based on the torque request 208. For example, the target cylinder activation/deactivation parameters 248 may include a target number of activated cylinders and a target sequence for activating and deactivating cylinders. The cylinder actuator module 120 deactivates the intake and exhaust valves of the cylinders that are to be deactivated based on the target cylinder activation/deactivation parameters 248. The cylinder actuator module 120 allows opening and closing of the intake and exhaust valves of cylinders that are to be activated based on the target cylinder activation/deactivation parameters 248.

Fueling is halted (zero fueling) to cylinders that are to be deactivated based on the target cylinder activation/deactivation parameters 248, and fuel is provided the cylinders that are to be activated based on the target cylinder activation/deactivation parameters 248. Spark is provided to the cylinders that are to be activated based on the target cylinder activation/deactivation parameters 248. Spark may be provided or halted to cylinders that are to be deactivated based on the target cylinder activation/deactivation parameters 248. Cylinder deactivation is different than fuel cutoff (e.g., deceleration fuel cutoff) in that the intake and exhaust valves of cylinders to which fueling is halted during fuel cutoff are still opened and closed during the fuel cutoff whereas the intake and exhaust valves are maintained closed when deactivated.

Figure 3:
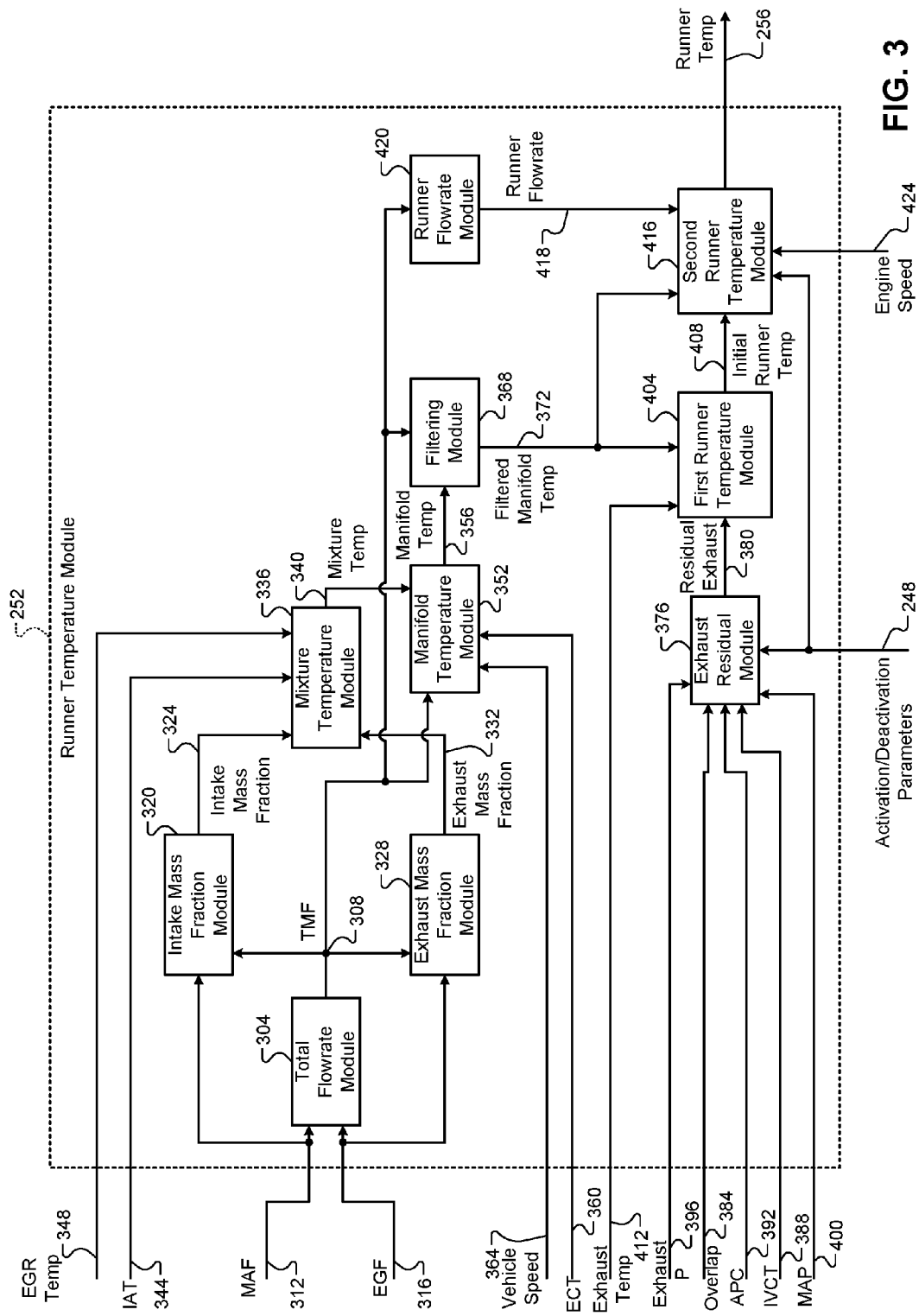
FIG. 3 is a functional block diagram of an example runner temperature module according to the present disclosure.

A runner temperature module 252 determines a temperature of gas (e.g., air or a mixture of air and recirculated exhaust) within the intake runner of the cylinder 118. The temperature of the gas within the intake runner of the cylinder 118 will be referred to as a runner temperature 256. The runner temperature module 252 determines a runner temperature for each cylinder. FIG. 3 includes a functional block diagram of an example implementation of the runner temperature module 252.

Referring now to FIGS. 2 and 3, a total flowrate module 304 determines a total mass flowrate (TMF) 308 based on a mass air flowrate (MAF) 312 and a recirculated exhaust gas flowrate (EGF) 316. The TMF 308 may correspond to a total mass flowrate of gas (e.g., ambient air and recirculated exhaust gas) into the intake manifold 110. The total flowrate module 304 may set the TMF 308, for example, equal to the MAF 312 plus the recirculated EGF 316. The MAF 312 may be measured using, for example, the MAF sensor 186 or estimated based on one or more other parameters. The recirculated EGF 316 may be measured using a sensor or estimated based on one or more other parameters.

An intake mass fraction module 320 determines an intake mass fraction 324 based on the TMF 308 and the MAF 312. The intake mass fraction 324 corresponds to the portion of the TMF 308 that is ambient air. The intake mass fraction module 320 may set the intake mass fraction 324, for example, equal to the MAF 312 divided by the TMF 308.

An exhaust mass fraction module 328 determines an exhaust mass fraction 332 based on the TMF 308 and the recirculated EGF 316. The exhaust mass fraction 332 corresponds to the portion of the TMF 308 that is recirculated exhaust gas. The exhaust mass fraction module 328 may set the exhaust mass fraction 332, for example, equal to the recirculated EGF 316 divided by the TMF 308.

A mixture temperature module 336 determines a mixture temperature 340 based on the intake mass fraction 324, the exhaust mass fraction 332, an intake air temperature (IAT) 344, and a recirculated exhaust temperature 348. The mixture temperature 340 may correspond to a temperature of gas flowing into the intake manifold 110 after mixture with recirculated exhaust. The mixture temperature module 336 may set the mixture temperature 340, for example, using the equation:

$$T\text{Mix} = (\text{EMF} * T\text{egr}) + (\text{IMF} * \text{IAT}),$$

where TMix is the mixture temperature 340, EMF is the exhaust mass fraction 332, Tegr is the recirculated exhaust temperature 348, IMF is the intake mass fraction 324, and IAT is the IAT 344. The recirculated exhaust temperature 348 may be measured using a sensor or estimated based on one or more other parameters. The IAT 344 may be measured, for example using the IAT sensor 192, or estimated based on one or more other parameters A manifold temperature module 352 determines a manifold temperature 356 based on the mixture temperature 340, the TMF 308, an engine coolant temperature (ECT) 360, and a vehicle speed 364. The manifold temperature 356 may correspond to a temperature of the gas within the intake manifold 110. The manifold temperature module 352 may set the manifold temperature 356, for example, using the equation:

$$T\text{man} = T\text{Mix} + (\text{ECT} - T\text{Mix}) * \text{Scalar1},$$

where TMan is the manifold temperature 356, TMix is the mixture temperature 340, ECT is the ECT 360, and Scalar1 is a first scalar value. The manifold temperature module 352 may determine the first scalar value based on the vehicle speed 364 and the TMF 308. For example, the manifold temperature module 352 may determine the first scalar value using one of a function and a mapping that relates the vehicle speed 364 and the TMF 308 to the first scalar value. The vehicle speed 364 may be measured using one or more sensors or estimated based on one or more other parameters. The ECT 360 may be measured, for example using the ECT sensor 182, and/or estimated based on one or more other parameters.

A filtering module 368 applies a filter to the manifold temperature 356 to produce a filtered manifold temperature 372. For example, the filtering module 368 may set the filtered manifold temperature 372 using the equation:

$$T\text{ManFilt} = [T\text{Man} - \text{Prev}T\text{Man}] * \text{Scalar2} + \text{Prev}T\text{Man},$$

where TManFilt is the filtered manifold temperature 372, TMan is the manifold temperature 356, Prev TMan is a previous (e.g., last) value of the filtered manifold temperature 372, and Scalar2 is a second scalar value. The filtering module 368 may determine the second scalar value based on the TMF 308. For example, the filtering module 368 may determine the second scalar value using one of a function and a mapping that relates the TMF 308 to the second scalar value.

An exhaust residual module 376 determines a residual exhaust value 380 for the cylinder 118. The residual exhaust value 380 may correspond to an amount of residual exhaust pushed back from the cylinder 118 into the intake runner of the cylinder 118. The exhaust residual module 376 determines the residual exhaust value 380 based on an overlap 384 of the intake and exhaust valves of the cylinder 118, a closing timing 388 of the intake valve(s) of the cylinder 118, an amount of air per cylinder (APC) 392 of the cylinder 118, an exhaust pressure 396, and an intake manifold pressure 400. The exhaust residual module 376 determines the residual exhaust value 380 further based on whether the cylinder 118 is activated or deactivated.

In various implementations, the residual exhaust value 380 may be a value between 0.0 and 1.0. When the cylinder 118 is deactivated, the exhaust residual module 376 may set the residual exhaust value 380 to 0.0. When the cylinder 118 is activated, the exhaust residual module 376 may set the residual exhaust value 380 using one or more functions and/or mappings that relate the overlap 384, the closing timing 388, the APC 392, and a value equal to the exhaust pressure 396 divided by the intake manifold pressure 400.

The overlap 384 may correspond to an amount of angular rotation where both the intake and exhaust valves of the cylinder 118 are open. The closing timing 388 may correspond to a position of the crankshaft where the intake valve(s) of the cylinder 118 is/are closed. The exhaust pressure 396 may correspond to an estimated pressure within an exhaust manifold or an estimated pressure in an exhaust port of the cylinder 118. The intake manifold pressure 400 may be measured, for example using the MAP sensor 184, and/or determined based on one or more other parameters. The APC 392 is discussed further below in conjunction with FIG. 2.

A first runner temperature module 404 determines an initial runner temperature 408 based on the filtered manifold temperature 372, the residual exhaust value 380, and an exhaust temperature 412. The initial runner temperature 408 may correspond to a temperature of the gas within the intake runner of the cylinder 118. The first runner temperature module 404 may set the initial runner temperature 408, for example, using the equation:

$$TRunner1 = [TManFilt*(1-Res\ Exh)] + (TExh*Res\ Exh),$$

where TRunner1 is the initial runner temperature 408, TManFilt is the filtered manifold temperature 372, Res Exh is the residual exhaust value 380, and TExh is the exhaust temperature 412. The exhaust temperature 412 may correspond to a temperature of exhaust in the exhaust port or in the exhaust manifold and may be measured using a sensor or estimated based on one or more other parameters.

A second runner temperature module 416 determines the runner temperature 256 based on a previous value of the runner temperature 256 and one of the initial runner temperature 408 and the filtered manifold temperature 372. The second runner temperature module 416 determines the runner temperature 256 further based on a third scalar value and whether the cylinder 118 is activated or deactivated. The runner temperature 256 may correspond to a temperature of the gas within the intake runner of the cylinder 118.

For example, when the cylinder 118 is activated, the second runner temperature module 416 may set the runner temperature 256 using the equation:

$$TRunner = [TRunner1 - PrevTRunner]*Scalar3 + PrevTRunner,$$

where TRunner is the runner temperature 256, TRunner1 is the initial runner temperature 408, PrevTRunner is the previous (e.g., last) value of the runner temperature 256, and scalar3 is the third scalar value. When the cylinder 118 is activated, the second runner temperature module 416 may determine the third scalar value using one of a function and a mapping that relates a runner flowrate 418 to the third scalar value. A runner flowrate module 420 may set the runner flowrate 418, for example, equal to the TMF 308 divided by the number of activated cylinders of the engine 102.

When the cylinder 118 is de-activated, the second runner temperature module 416 may set the runner temperature 256 using the equation:

$$TRunner = [TManFilt - PrevTRunner]*Scalar3 + PrevTRunner,$$

where TRunner is the runner temperature 256, TManFilt is the filtered manifold temperature 372, PrevTRunner is the previous (e.g., last) value of the runner temperature 256, and scalar3 is the third scalar value. When the cylinder 118 is de-activated, the second runner temperature module 416 may determine the third scalar value using one of a function and a mapping that relates an engine speed 424 to the third scalar value.

Referring back to FIG. 2, a volumetric efficiency module 428 determines a volumetric efficiency (VE) 432. The volumetric efficiency module 428 determines the VE 432 further based on an engine speed, an intake manifold pressure, an intake cam phaser position, an exhaust cam phaser position, and an intake manifold actuator state (e.g., whether an intake manifold tuning valve is open or closed). The volumetric efficiency module 428 may determine the VE 432 further based on the runner temperature 256. For example, the volumetric efficiency module 428 may determine the VE 432 using one or more functions or mappings that relate the above parameters to the VE 432.

An air per cylinder (APC) module 436 determines the APC 392 based on the VE 432, the runner temperature 256, an intake manifold pressure, and a volume of the cylinder 118. The APC 392 may correspond to a predicted amount (e.g., mass) of air that will be trapped within the cylinder 118 during a future combustion event. For example, the APC module 436 may determine the APC 392 using the equation:

$$APC = \frac{\eta * V * P}{R * TRunner},$$

where APC is the APC 392, η is the VE 432, V is the volume of the cylinder 118, P is an intake manifold pressure or a pressure within the intake runner of the cylinder 118, R is the Ideal Gas Constant, and TRunner is the runner temperature 256.

One or more engine actuators may be controlled based on the APC 392. For example, the phaser control module 237 may control or adjust the target intake cam phaser angle 238 and/or the target exhaust cam phaser angle 239 based on the APC 392. Additionally or alternatively, the spark control module 224 may control or adjust the target spark timing 228 based on the APC 392. Additionally or alternatively, the fuel control module 232 may control or adjust the target fueling parameters based on the APC 392. Additionally or alternatively, one or more other engine actuators may be controlled based on the APC 392.

Figure 4:
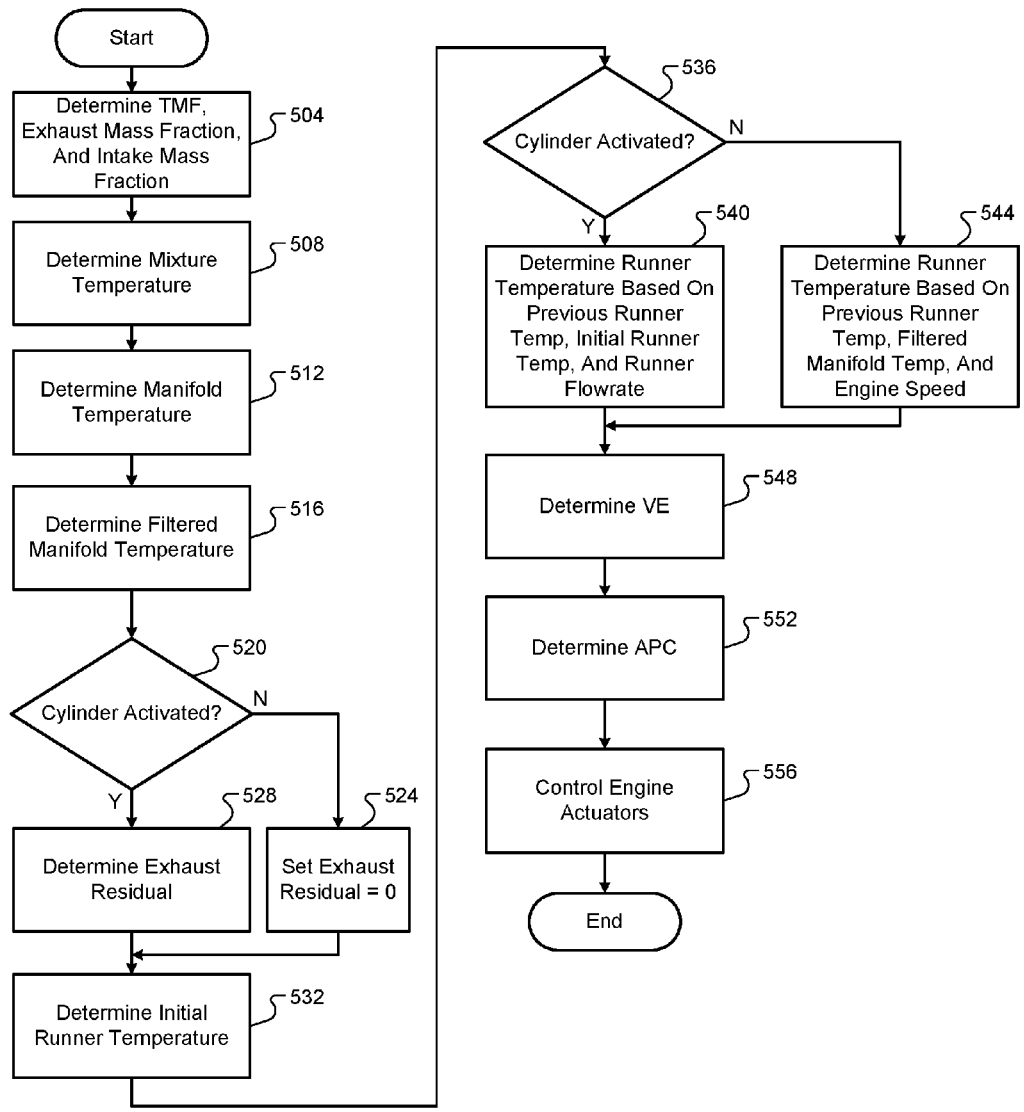
FIG. 4 is a flowchart depicting an example of a method for determining temperature within an intake runner and controlling one or more engine operating parameters based on the intake runner temperature according to the present disclosure.

Referring now to FIG. 4, a flowchart depicting an example of a method for determining the runner temperature 256 and controlling one or more engine actuators is presented. Control begins with 504 where the total flowrate module 304 determines the TMF 308, the exhaust mass fraction module 328 determines the exhaust mass fraction 332, and the intake mass fraction module 320 determines the intake mass fraction 324.

At 508, the mixture temperature module 336 determines the mixture temperature 340 based on the intake mass fraction 324, the exhaust mass fraction 332, the IAT 344, and the recirculated exhaust temperature 348. The manifold temperature module 352 determines the manifold temperature 356 at 512 based on the mixture temperature 340, the TMF 308, the ECT 360, and the vehicle speed 364.

The filtering module 368 generates the filtered manifold temperature 372 at 516 based on the manifold temperature 356, the previous value of the filtered manifold temperature 372, and the TMF 308. At 520, the exhaust residual module 376 determines whether the cylinder 118 is activated. If 520 is false, the exhaust residual module 376 may set the exhaust residual value 380 equal to zero at 524, and control may continue with 532. If 520 is true, the exhaust residual module 376 may determine the exhaust residual value 380 at 528 based on the overlap 384 of the intake and exhaust valves of the cylinder 118, the intake valve closing timing (IVCT) 388 of the cylinder 118, the APC 392 of the cylinder 118, the exhaust pressure 396, and the intake manifold pressure 400. Control may continue with 532.

At 532, the first runner temperature module 404 determines the initial runner temperature 408 for the cylinder 118 based on the exhaust residual value 380, the exhaust temperature 412, and the filtered manifold temperature 372. At 536, the second runner temperature module 416 may determine whether the cylinder 118 is activated. If 536 is true, control continues with 540. If 536 is false, control transfers to 544.

The second runner temperature module 416 determines the runner temperature 256 at 540 based on the previous value of the runner temperature 256, the initial runner temperature 408, and the runner flowrate 418. At 544 (i.e., when the cylinder 118 is de-activated), the second runner temperature module 416 may determine the runner temperature 256 based on the filtered manifold temperature 372, the previous value of the runner temperature 256, and the engine speed 424. Control continues with 548 after 540 or 544.

At 548, the volumetric efficiency module 428 determines the VE 432 based on the runner temperature 256. The APC module 436 determines the APC 392 of the cylinder 118 based on the VE 432 and the runner temperature 256 at 552. At 556, one or more engine actuators are controlled based on the APC 392. For example, the fuel control module 232 may determine one or more of the target fueling parameters 236 for the cylinder 118 based on the APC 392, the spark control module 224 may determine the target spark timing 228 for the cylinder 118 based on the APC 392, and/or the phaser control module 237 may determine the target intake and exhaust cam phaser angles 238 and 239 for the cylinder 118 based on the APC 392. Control may then end.

While control is shown and discussed as ending, the method of FIG. 4 may be illustrative of one control loop, and control loops may be performed at a predetermined rate. Additionally, while the method of FIG. 4 is discussed in conjunction with the cylinder 118, the method of FIG. 4 may be performed for each cylinder of the engine 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system of a vehicle, comprising:
a manifold temperature module that determines a first temperature of gas in an intake manifold of an engine;
a first runner temperature module that determines a second temperature of gas in an intake runner associated with a cylinder based on the first temperature of the gas in the intake manifold, an exhaust temperature, and an amount of exhaust expelled from the cylinder into the intake runner through one or more intake valves of the cylinder;
a second runner temperature module that:
   when the cylinder is activated:
      determines a third temperature of the gas in the intake runner associated with the cylinder based on a previous value of the third temperature of the gas in the intake runner, a scalar value, and the second temperature of the gas in the intake runner; and
      determines the scalar value based on a mass flowrate of gas into the intake runner; and
   when the cylinder is deactivated:
      determines the third temperature of the gas in the intake runner associated with the cylinder based on the previous value of the third temperature of the gas in the intake runner, the scalar value, and the first temperature of the gas in the intake manifold; and
      determines the scalar value based on an engine speed; and
at least one of:
   a fuel control module that controls fueling of the cylinder based on the third temperature of the gas in the intake runner; and
   a spark control module that controls spark of the cylinder based on the third temperature of the gas in the intake runner.

2. The engine control system of claim 1 wherein the first runner temperature module determines the second temperature of the gas in the intake runner further based on whether the cylinder is activated or deactivated.

3. The engine control system of claim 1 further comprising an exhaust residual module that determines the amount of exhaust based on whether the cylinder is activated or deactivated.

4. The engine control system of claim 3 wherein the exhaust residual module determines the amount of exhaust further based on aa period between when intake and exhaust valves of the cylinder are both open and (ii) an intake valve closing timing of the cylinder.

5. The engine control system of claim 4 wherein the exhaust residual module determines the amount of exhaust further based on a pressure within the intake manifold.

6. An engine control method for a vehicle, comprising:
 determining a first temperature of gas in an intake manifold of an engine;
 determining a second temperature of gas in an intake runner associated with a cylinder based on the first temperature of the gas in the intake manifold, an exhaust temperature, and an amount of exhaust expelled from the cylinder into the intake runner through one or more intake valves of the cylinder;
 when the cylinder is activated, determining a third temperature of the gas in the intake runner associated with the cylinder based on a previous value of the third temperature of the gas in the intake runner, a scalar value, the second temperature of the gas in the intake runner;
 when the cylinder is deactivated, determining the third temperature of the gas in the intake runner associated with the cylinder based on the previous value of the third temperature of the gas in the intake runner, the scalar value, the first temperature of the gas in the intake manifold;
 when the cylinder is activated, determining the scalar value based on a mass flowrate of gas into the intake runner; and
 when the cylinder is deactivated, determining the scalar value based on an engine speed; and
 at least one of:
  controlling fueling of the cylinder based on the third temperature of the gas in the intake runner; and
  controlling spark of the cylinder based on the third temperature of the gas in the intake runner.

7. The engine control method of claim 6 further comprising determining the second temperature of the gas in the intake runner further based on whether the cylinder is activated or deactivated.

8. The engine control method of claim 6 further comprising determining the amount of exhaust based on whether the cylinder is activated or deactivated.

9. The engine control method of claim 8 further comprising determining the amount of exhaust further based on (i) a period between when intake and exhaust valves of the cylinder are both open and (ii) an intake valve closing timing of the cylinder.

10. The engine control method of claim 9 further comprising determining the amount of exhaust further based on a pressure within the intake manifold.

11. The engine control system of claim 1 wherein, when the cylinder is activated, the second runner temperature module sets the third temperature of the gas in the intake runner based on the previous value of the third temperature plus a product of (i) the scalar value and (ii) a difference between the second temperature of the gas in the intake runner and the previous value of the third temperature.

12. The engine control system of claim 1 wherein, when the cylinder is deactivated, the second runner temperature module sets the third temperature of the gas in the intake runner based on the previous value of the third temperature plus a product of (i) the scalar value and (ii) a difference between the first temperature of the gas in the intake manifold and the previous value of the third temperature.

13. The engine control method of claim 6 further comprising, when the cylinder is activated, setting the third temperature of the gas in the intake runner based on the previous value of the third temperature plus a product of (i) the scalar value and (ii) a difference between the second temperature of the gas in the intake runner and the previous value of the third temperature.

14. The engine control method of claim 6 further comprising, when the cylinder is deactivated, setting the third temperature of the gas in the intake runner based on the previous value of the third temperature plus a product of (i) the scalar value and (ii) a difference between the first temperature of the gas in the intake manifold and the previous value of the third temperature.

15. The engine control system of claim 1 further comprising an exhaust residual module that:
 when the cylinder is deactivated, sets the amount of exhaust to zero; and
 when the cylinder is activated, sets the amount of exhaust based on a period between when intake and exhaust valves of the cylinder are both open, an intake valve closing timing of the cylinder, and a pressure within the intake manifold.

16. The engine control method of claim 6 further comprising:
 when the cylinder is deactivated, setting the amount of exhaust to zero; and
 when the cylinder is activated, setting the amount of exhaust based on a period between when intake and exhaust valves of the cylinder are both open, an intake valve closing timing of the cylinder, and a pressure within the intake manifold.

* * * * *